United States Patent
St. Pierre et al.

(10) Patent No.: US 7,136,895 B2
(45) Date of Patent: Nov. 14, 2006

(54) SYSTEM AND METHOD FOR FORWARD CHAINING WEB-BASED PROCEDURE CALLS

(75) Inventors: Robert P. St. Pierre, Sunnyvale, CA (US); Glenn C. Scott, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 756 days.

(21) Appl. No.: 10/205,108

(22) Filed: Jul. 24, 2002

(65) Prior Publication Data

US 2004/0019678 A1 Jan. 29, 2004

(51) Int. Cl.
*G06F 15/16* (2006.01)

(52) U.S. Cl. ................................ 709/202; 709/225

(58) Field of Classification Search ........ 709/202–203, 709/225; 705/9–10
See application file for complete search history.

(56) References Cited

U.S. PATENT DOCUMENTS

| | | | | |
|---|---|---|---|---|
| 5,715,453 A | * | 2/1998 | Stewart | 715/513 |
| 5,832,226 A | * | 11/1998 | Suzuki et al. | 709/223 |
| 6,052,710 A | * | 4/2000 | Saliba et al. | 709/203 |
| 6,125,352 A | * | 9/2000 | Franklin et al. | 705/26 |
| 6,260,059 B1 | * | 7/2001 | Ueno et al. | 709/202 |
| 6,438,576 B1 | * | 8/2002 | Huang et al. | 709/202 |
| 6,691,151 B1 | * | 2/2004 | Cheyer et al. | 709/202 |
| 6,859,931 B1 | * | 2/2005 | Cheyer et al. | 719/317 |
| 2002/0040314 A1 | * | 4/2002 | Tolson | 705/10 |
| 2003/0236693 A1 | * | 12/2003 | Chen et al. | 705/9 |

OTHER PUBLICATIONS

Box, Don, et al., Simple Object Access Protocol (SOAP) 1.1 retrieved online at http://www.w3.org/TR/2000/NOTE-SOAP-20000508.

* cited by examiner

*Primary Examiner*—William Vaughn, Jr.
*Assistant Examiner*—Greg Bengzon
(74) *Attorney, Agent, or Firm*—Lahive & Cockfield, LLP

(57) ABSTRACT

A method of chaining together multiple dependent web-based procedure calls into a single request is disclosed. A request containing multiple MIME encoded service requests is transmitted to a first service. The request is parsed and the first service identified and performed. The results of the first service are appended to the remainder of the request which is forwarded to a second service listed in the request. The second service listed in the request may use the output of the first service as input and performs the second service. The process continues until the last service listed in the request is performed. Any output from the performance of the service requests is returned to the requesting device following execution of a MIME encoded callback request, the callback request being embedded in the original request following the last of the listed service requests.

20 Claims, 4 Drawing Sheets

SYSTEM AND METHOD FOR FORWARD CHAINING WEB-BASED PROCEDURE CALLS

RELATED APPLICATIONS

The illustrative embodiment of the present invention is related to four co-pending applications, A System and Method For Processing Callback Requests Included in Web-Based Procedure Calls, A System and Method For Processing Callback Requests Included in Web-Based Procedure Calls Through a Firewall, MIME Encoding of Values for Web Procedure Calls, and System and Method for Dynamically Routing Web Procedure Calls filed concurrently with the present application.

FIELD OF THE INVENTION

The illustrative embodiment of the present invention relates generally to web-based procedure calls and more particularly to chaining multiple dependent web-based procedure calls together into a single call so that the output of one procedure is used as the input for another procedure.

BACKGROUND

Distributed devices on a network frequently request services from remote devices. In a typical scenario, a requesting device sends a request or procedure call over a network to a receiving server via a transport protocol such as the Hyper Text Transport Protocol (HTTP). The requests are connection-based and require a connection to remain open between the requesting device and the receiving server until the requested action has been performed and the response returned to the requesting device. Conventionally, the requests work on a response-request basis where each request is for a single service and the output from the performed service is sent back over the open connection.

Unfortunately, the conventional response-request model does not address situations where the requesting device needs several different services performed which are dependent upon each other. For example, the situtation where a requesting device needs the output from a first service for the performance of a second service, and the output from the second service is required for the performance of a third service. In such a situation, the requesting device is required to make three separate requests in sequence while arranging to use the output from one service as the input for another service. The three requests requires three separate connections between the requesting device and the receiving device or devices holding the services. Existing alternatives such as the Simple Object Access Protocol (SOAP) require the use of heavyweight XML parsers which represent a resource drain for smaller or busy devices.

SUMMARY OF THE INVENTION

The illustrative embodiment of the present invention provides a method of chaining together multiple dependent web-based procedure calls into a single request. A request containing multiple service requests is transmitted to a first service. The request is parsed and the first service request is identified and performed. The results of the first service are appended to the remainder of the request which is forwarded to a second service listed in the request. The second service listed in the request uses the output of the first service as input and performs the second service requested. The process iterates until the last service listed in the request is performed. A new connection to the requesting device from the electronic device holding the last service performed is established pursuant to a callback request included in the original request. A message is sent over the connection which includes the output from the performed services.

In one embodiment, an electronic device (receiving device) interfaced with a network receives a request (such as an HTTP request) from another electronic device (requesting device) that is interfaced with the network. The receiving device holds at least one of a number of services requested by the request. The request is parsed and a first requested service present on the receiving device is identified. The service on the receiving device performs the requested operation and appends the results to the original request. The original request and the appended results are forwarded to a second service listed in the request. The second service performs a requested operation prior to the results of the requested services being transmitted to the requesting device. In one aspect of the present invention, the second service uses the results from the operation performed by the first service to perform the requested second operation.

In another embodiment, an electronic device (requesting device) interfaced with a network transmits a request (such as an HTTP request) to another electronic device (receiving device) that is interfaced with the network. The request includes at least two dependent (chained) service requests and a callback request. The receiving device holds at least the first requested service. The callback request includes a destination port address on the requesting device. The requesting device listens at the destination port included in the callback request and accepts a connection request from the electronic device holding the last service. The requesting device receives the results of the final service over the new connection.

In an alternate embodiment, an electronic device (receiving device) interfaced with a network receives a request (such as an HTTP request) from another electronic device (requesting device) that is interfaced with the network. The receiving device holds at least one of a number of services requested by the request. The request is parsed and a first requested service located on the receiving device is identified. The service on the receiving device performs the requested operation, appends the results to the remainder of the request and forwards the request and results to a second service listed in the request. The second service performs its operation using the results of the first service as input. In one aspect of the present invention, the second service is on the same electronic device as the first service. In a different aspect of the present invention, the second service is on a different electronic device from the first service. Following the completion of the last listed service, a connection is opened between the electronic device holding the last service and the requesting device. The connection is opened using a return destination address included in a callback request submitted as part of the original request. The results of the final service are transmitted to the requesting device over the new connection.

DETAILED DESCRIPTION

The illustrative embodiment of the present invention provides a method of chaining together multiple dependent web-based procedure calls into a single request. The procedure calls are embedded into the body of the request using MIME (Multipurpose Internet Mail Extensions) encoding which is discussed in more detail below. A "web procedure call" refers to any interaction between two devices or services in a network environment where the calling party requests some activity by the called party (e.g., to accept data or perform a specified task). Each succeeding service may use the output of the previously performed procedure as input. The requests are forwarded from one service to another along with the output of the previously performed services, a process referred to as "forward chaining". The electronic device holding the last service executing a request opens up a new connection back to the requesting device in response to a callback request included with the service requests in the MIME body. The results of the multiple requests are transmitted over the new connection back to the requesting device.

Figure 1:
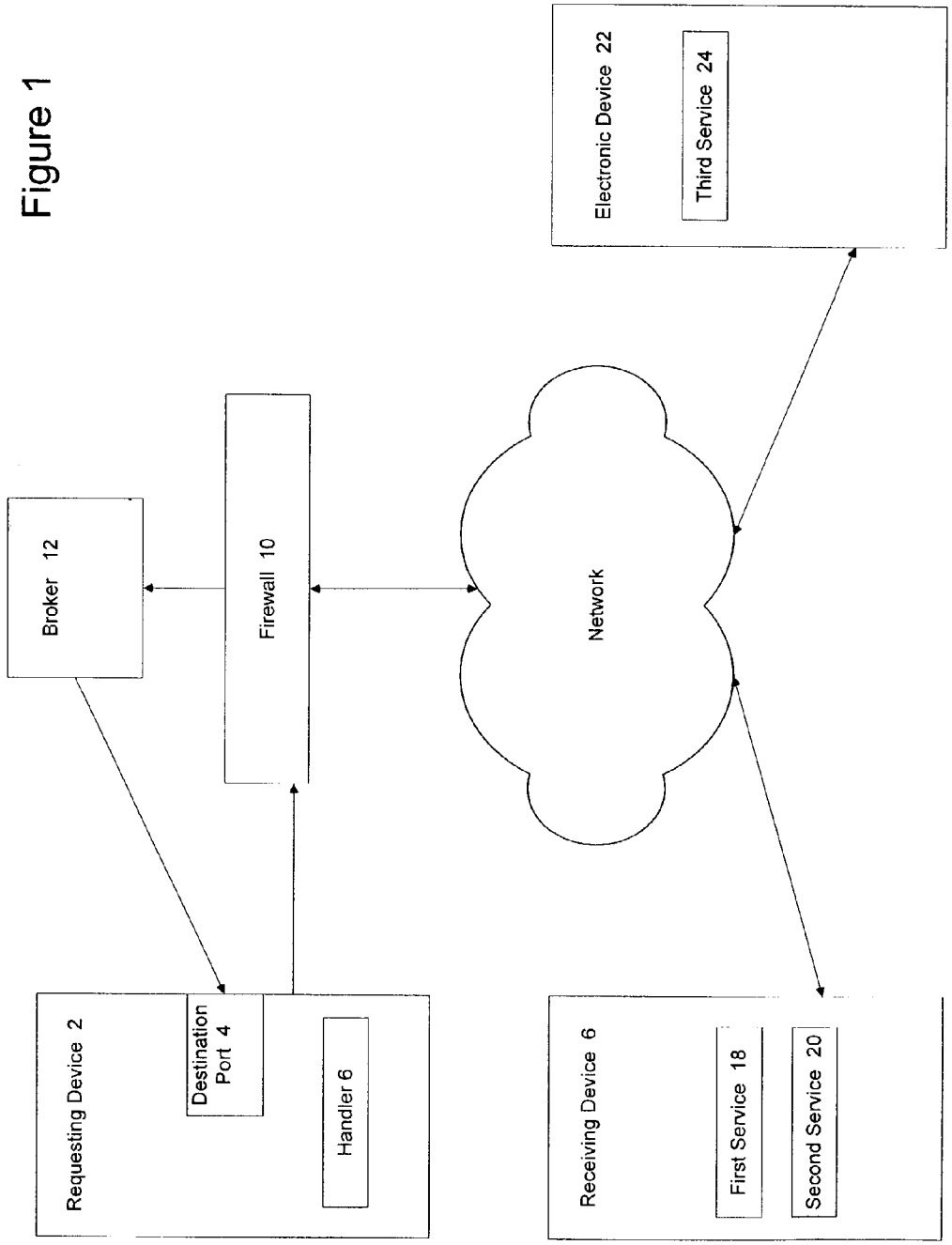
FIG. 1 depicts a block diagram of an environment suitable for practicing the illustrative embodiment of the present invention.

FIG. 1 depicts an environment suitable for practicing an illustrative embodiment of the present invention. A plurality of electronic devices including a requesting device 2 and a receiving device 16 are interfaced with a network 14. The electronic devices may each be a desktop computer, a workstation, a PDA, a server, a client device, a web server, or other electronic device with a microprocessor interfaced with the network 14. The electronic devices may be arranged in a distributed client-server architecture with the server located outside the firewall, a peer-to-peer architecture or some other type of architecture. The network 14 may be the Internet, an extranet, an intranet, a wide area network (WAN), a metropolitan area network (MAN), a local area network (LAN), a satellite network, or some other type of network. The requesting device 2 includes a destination port 4 on which to accept connections from other devices responding to requests. The requesting device 2 may also include a handler 6 which is designated to receive the results of the requests. The requesting device 2 may receive the results of the request at the destination port 4 through a firewall 10 and via a broker device 12. The firewall is software (or a software-hardware combination) which screens incoming and outgoing network traffic according to pre-determined parameters. The broker device 12 is an electronic device which is allowed by the firewall 10 to receive messages from addresses outside the firewall and to contact addresses behind the firewall. The use of a broker device 12 is often necessary in corporate environments where devices outside the corporate network are not allowed to initiate connections with devices inside the corporate network.

The receiving device 16 includes a first service 18 and second service 20. The first service 18 and second service 20 are computer-executable code which perform operations in response to service requests. The requesting device 2 sends a request, such as an HTTP request, with multiple web procedure calls, to the receiving device 16. The request may be an HTTP, FTP (File Transport Protocol), SMTP (Simple Mail Transport Protocol) or some other type of request utilizing MIME encoding. The request includes a callback request which follows the last of the service requests. The callback request specifies a destination address and port 4 on the requesting device 2, as well as the address of the broker device 12 (if one is being used), to be used for a return connection back to the requesting device. The callback request may include the address of the handler 6 on the receiving device 2 as a destination for the results of the requested procedures. An additional electronic device 22 which is also interfaced with the network includes a third service 24. The original request directed to the first service on the receiving device 16, includes service requests for the second service and the third service which require the request to be forwarded upon the completion of each service. Those skilled in the art will recognize that additional services and additional electronic devices interfaced with the network 14 may be included in the requested services without departing from the scope of the present invention.

Figure 2:
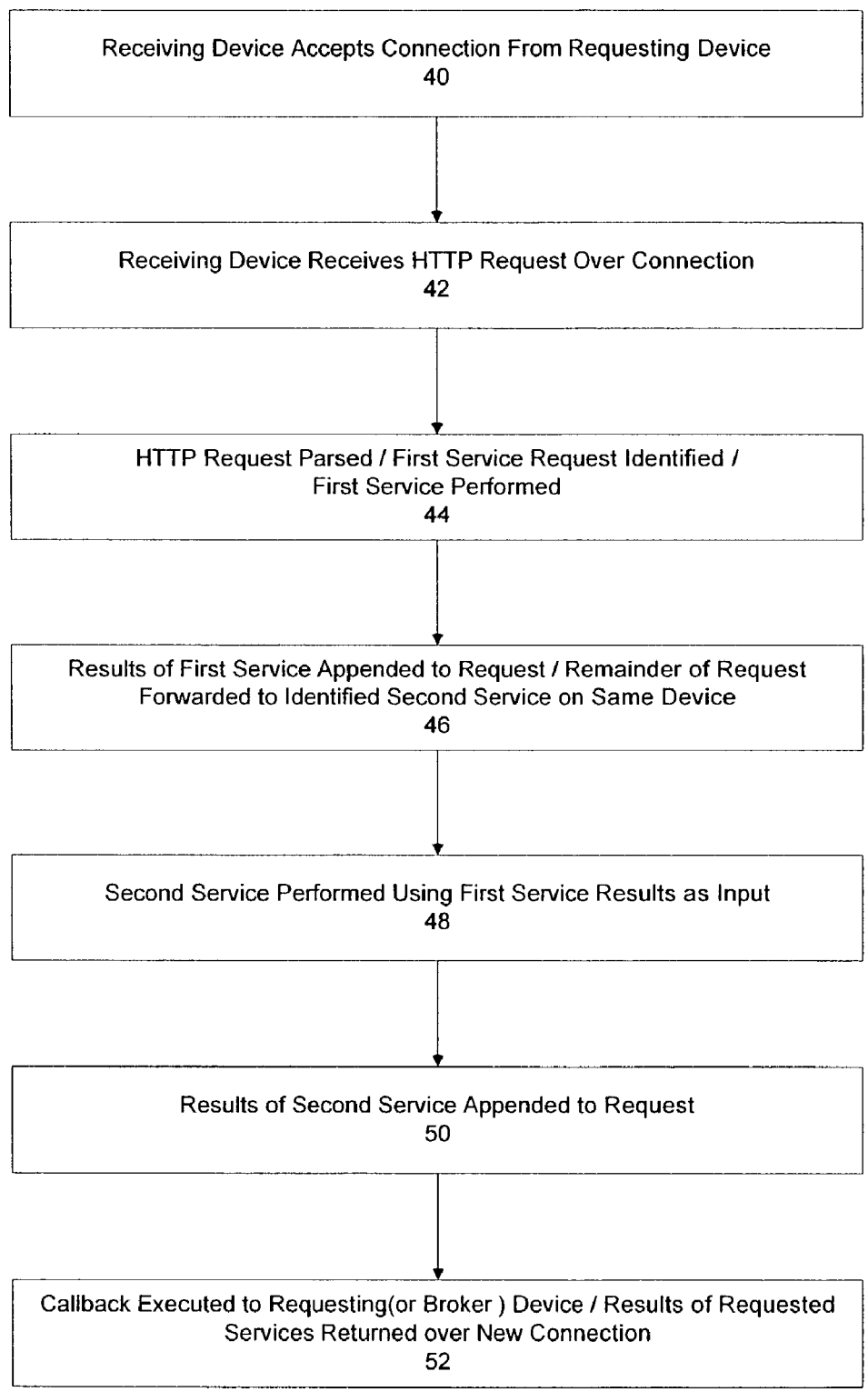
FIG. 2 is a flowchart of the sequence of steps performed by a receiving device accepting a chained service request.

The illustrative embodiment of the present invention transmits an HTTP request, or other transport protocol request to the receiving device 16. FIG. 2 is a flowchart of the sequence of steps performed by the illustrative embodiment of the present invention in processing the request. The sequence begins when the receiving device 16 accepts a connection request from the requesting device 2 (step 40). The receiving device 16 then receives an HTTP request containing multiple service requests from the requesting device 2 (step 42). The request includes a callback request and may also include a broker address, password and time parameter to be used in communications with the broker. The callback request functions as described in an application filed concurrently herewith entitled A System and Method For Processing Callback Requests Included in Web-Based Procedure Calls, the contents of which are hereby incorporated by reference, with the exception that the request is embedded in the MIME body rather than being part of the HTTP URL. The location of the callback request following all of the service requests ensures that it is not executed until after the fulfillment of the service requests. The MIME body of the HTTP request and the callback request is discussed further in the example below. The use of the broker device 12, password and time parameter are each discussed in detail in A System and Method For Processing Callback Requests Included in Web-Based Procedure Calls Through a Firewall filed concurrently herewith, the contents of which are hereby incorporated by reference.

A MIME parser parses the original request and the embedded service request for the first service 18 is identified. The first service 18 performs the requested operation (step 44) and any output from the requested service is appended to the request. Those skilled in the art will recognize that the service may perform an action that does not generate any output. The parser identifies the next requested service (i.e.: the second service) and the output and the remainder of the request is forwarded to the identified next requested second service 20 (step 46). The second service is performed and may use the first service results as input (step 48). The results of the second service are then appended to the request (step 50). Once there are no more service requests listed, the identified callback request is executed, and the results of the second service are sent over a new connection to the requesting device 2 (step 52). If a firewall prevents connections directly to the requesting device 2, the broker device 12 is used as an intermediary to forward the results to the requesting device. Because the request contains multiple service requests which are forwarded directly from one service to the next, the requesting device 2 is only required to use two connections, one to the receiving device 16 when making the request, and a different connection when receiving results either to the electronic device holding the last service listed in the request or to the broker device 12. After transmitting the request, the original connection may be terminated even before the performance of the first service. Those skilled in the art will recognize that the connection may be terminated after the requested procedure is initiated without departing from the scope of the present invention.

Figure 3:
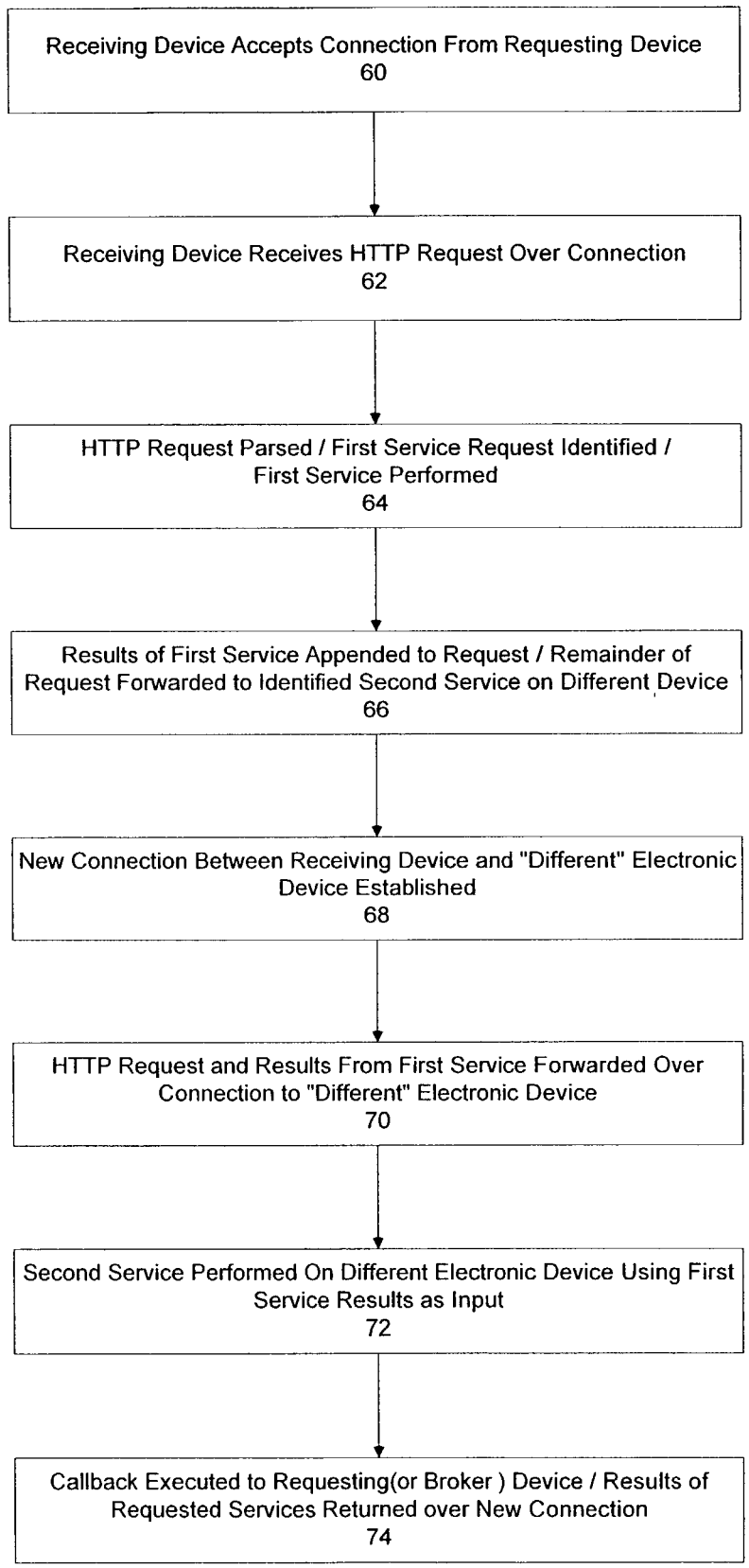
FIG. 3 is a flowchart of the sequence of steps performed by a receiving device accepting a chained service request when the requested services are present on more than one electronic device.

FIG. 2 illustrates the processing of a request where all of the services being requested reside on the same electronic device. The illustrative embodiment of the present invention also processes requests for services on multiple devices as depicted by the sequence of steps shown in FIG. 3. The sequence begins when the receiving device 16 receives a connection request from the requesting device 2 and establishes a connection (step 60). The receiving device accepts an HTTP request containing MIME encoded multiple service requests over the connection (step 62). The HTTP request is parsed, the first service request identified and the first service performs the requested operation (step 64). The results from the first service request are appended to the remainder of the request (the first service request is removed or flagged as complete depending upon the implementation) and a second service request on a different electronic device is identified (step 66). A new connection between the receiving device and a different electronic device is established (step 68). The HTTP request and the results from the first service are forwarded over the connection to the different electronic device and the second service (step 70). The second requested service is performed on the different electronic device using the results from the first service as input and the results appended to the HTTP request. Those skilled in the art will recognize that the services listed in the HTTP request may be located on many different devices. Similarly, the requested services may require the performance of a service on a first device, the performance of a service on a second device, and then the performance of a third service back on the first device using the results of the first two services. Once all of the requested services have been completed, the results are returned to the requesting device over a connection established pursuant to a callback request included with the HTTP request. The callback request is directed to a return destination address and port 4 (and optionally handler 6) on the requesting device 2.

Figure 4:
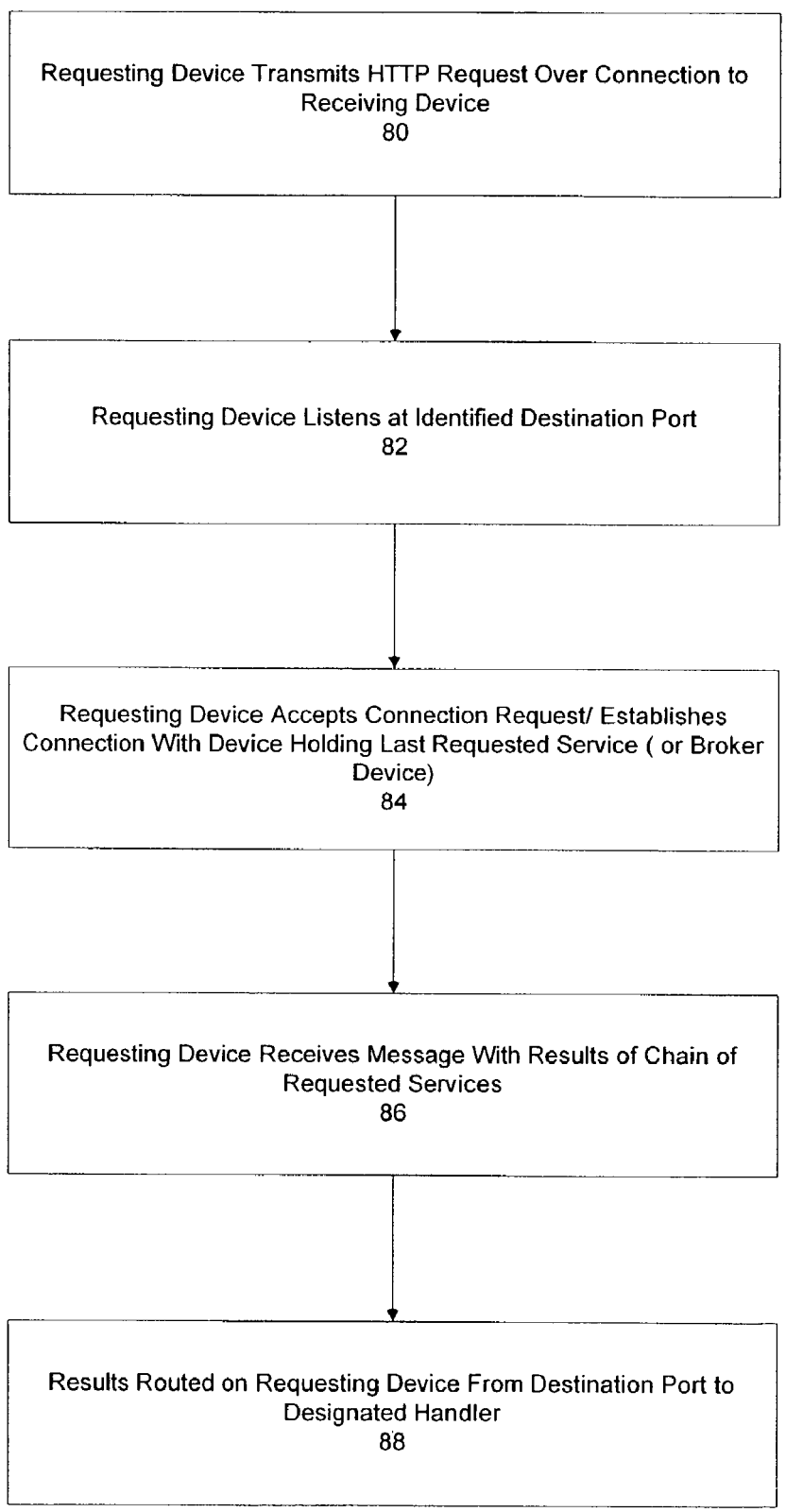
FIG. 4 is a flowchart of the sequence of steps performed by a requesting device submitting a chained service request.

The illustrative embodiment of the present invention saves resources on the requesting device 2 as connections do not need to be held open to the original receiving device during the performance of the requested services since the initial activity required of the requesting device is limited to the generation of the original request and listening for a response. FIG. 4 depicts the sequence of steps followed by the requesting device 2 in submitting a chained service request. The sequence begins when the requesting device 2 sends an HTTP request to the receiving device 16 (step 80). The request includes multiple service requests and a callback request designating a return destination address (of a handler 6) and port 4. The requesting device listens at the destination port 4 for a connection request from the device holding the last service requested in the HTTP request (or from the broker device 12 if a firewall 10 is preventing direct contact (step 82). Those skilled in the art will recognize that the port may be a well-known port traditionally used for certain types of services (i.e. the FTP Port) or may be a privately-defined port agreed upon in advance. The requesting device accepts a connection request and establishes a new connection with either the broker device 12 or the device holding the last requested service (step 84) and receives the forwarded request with results of the services appended (step 86). The requesting device 2 may create or designate a handler 6 specifically to receive the results of the callback request. The handler 6 is a logical address on the requesting device to which the results of the web procedure call are to be returned. The handler 6 is appended as an additional item to the callback request and is returned as a parameter when the receiving device 16 returns results of the web procedure calls. The results are then routed on the requesting device 2 from the destination port 4 to the designated handler 6 (step 88).

The original HTTP request includes multiple embedded chained web procedure calls. The procedure calls or service requests are MIME encoded in the body of the HTTP request. MIME is a specification for the format of non-text email attachments that allows the attachment to be sent over the Internet. MIME allows a mail client or web browser to send and receive things like spreadsheet files, audio files, video files and graphics files via Internet mail. The distinguishing characteristic of a MIME message is the presence of the MIME headers in email messages. When a MIME ready e-mail system receives a MIME encoded file, the binary file appears as an attachment and software in the computer reads the file.

An example illustrating the use of MIME encoding for multiple service requests is given below. The example graphs 30 days of stock quotes for Sun Microsystems, Inc.

```
-----------------------------------------------------------------
MIME-Version: 1.0
Content-Type: multipart/mixed;
boundary="-------------------9D5D373F369F78757FA67C00"
This is a multi-part message in MIME format.
-------------------9D5D373F369F78757FA67C00
Content-Type: text/plain; name=forward-chain
Content-Transfer-Encoding: 7bit
service:devnet:http://www.stocknames.com/lookup
service:devnet:http://www.quote.com:8080/getquote
service:devnet:http://www.graph.com/grapher
service:devnet:http://www.client.com:22681/imagehandler
-------------------9D5D373F369F78757FA67C00
Content-Type: x-devnet/string; name=company
Content-Transfer-Encoding: 7bit
Sun Microsystems, Inc
-------------------9D5D373F369F78757FA67C00
Content-Type: x-devnet/integer; name=days
Content-Transfer-Encoding: 7bit
30
-------------------9D5D373F369F78757FA67C00
```

The heading of the message shows that the MIME-Version is 1.0. The version number declares the message conforms to the MIME standard. The content-type header field is used to specify the type and subtype of data in the body of a message and to fully specify the encoding of such data. In other words, the content-type field describes the data contained in a body fully enough so that the parser can map the data to a variable with the correct name and an appropriate data type. The first content-type header in the example is listed as multipart with each piece of data to be separated by a boundary, - - - 9D5D373F369F78757FA67C00. This indicates to the parser that there are multiple parts to the message. A second content-type header field is listed as text/plain and named "forward-chain". The "forward-chain" name indicate that the message contains multiple service requests that will need to be forwarded. This alerts the MIME parser that multiple service requests are included. Content-transfer-encoding is listed as using 7 bits. The content-transfer-encoding header field specifies how the data is encoded to allow the data to pass through mail transports. The possible values for the content-transfer-encoding field are base64, quoted-printable, 8 bit, 7 bit, binary, and x-encodingName. 7 bit encoding indicates that the data is all represented as short lines of ASCII data.

The encoding definition is followed by three service requests and a callback request (to service:devnet:http://www.client.com:22681/imagehandler). The three service requests determine, in sequence, the stock symbol for the company, determine the price of the stock for each of 30 days, and graph the stock prices over the thirty day period. These requests use a couple of parameters listed as additional data. The string value for the company is listed as "Sun Microsystems, Inc.". The integer value for the number of days checked in the requested stock lookup is "30". The callback request establishes a connection to port 22681 on the requesting device where the results eventually are forwarded to the handler "imagehandler".

In one embodiment of the present invention, the request and the callback may use different protocols. For example, the request may be made using HTTP and specify an FTP response in the callback request. Those skilled in the art will recognize that a number of different types of protocols for the requests and responses may be utilized without departing from the scope of the present invention.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. In a network having at least two electronic devices and a plurality of services, said plurality of services provided by computer-executable code stored on at least one of said electronic devices, said at least two electronic devices including a requesting device and a receiving device, a method, comprising the steps of:

receiving over a connection at a first service on said receiving device a request from said requesting device, said request including at least two service requests and a callback request, said callback request including a return destination address on the requesting device, said at least two service requests including at least one service request for a service other than said first service;

performing the first service specified in said request;

appending a first result of said first service to said request; and forwarding said first result and said request to a second service listed in said request, said second service performing one of said at least two service requests prior to the results of said at least two service requests being transmitted over a new connection to the requesting device, the new connection created by a last service in the at least two service requests.

2. The method of claim 1 wherein said second service uses the first result of said first service as input for said second service.

3. The method of claim 1, comprising the further steps of:

transmitting the result of said second service and said request to an additional service listed in said request; and using the second result to perform said additional service specified in said request.

4. The method of claim 1 wherein each of said plurality of services are located on different electronic devices.

5. The method of claim 1 wherein at least two of said plurality of services are located on the same device.

6. The method of claim 1 wherein said request is an HTTP request.

7. The method of claim 6 wherein said service requests are encoded using MIME encoding.

8. The method of claim 1, comprising the further steps of:

transmitting the first and second results via a broker device, said broker device being a device authorized by said firewall to accept messages from addresses outside said firewall and send messages to addresses inside said firewall.

9. The method of claim 1, comprising the further steps of:

receiving said request using a first protocol; and transmitting said first and second result over said new connection using a protocol different from said first protocol.

10. In a network having at least two electronic devices and a plurality of services, said plurality of services provided by computer-executable code stored on at least one of said electronic devices, said at least two electronic devices including a requesting device and a receiving device, a medium holding computer-executable steps for a method, said method comprising the steps of:

providing a plurality of services, said services provided by computer-executable code stored on at least one of said electronic devices;

receiving over a connection at said first service on said receiving device a request from said requesting device, said request including at least two service requests and a callback request, said callback request including a return destination address on the requesting device, said at least two service requests including at least one service request for a service other than said first service;

performing the first service specified in said request;

forwarding the results of said first service and said request to a second service requested in said request;

performing the second service specified in said request, said second service using the results of said first service as input for said second service;

transmitting a message over a new connection from said at least one electronic device holding one of said plurality of services to the requesting device, said one of said plurality of services being the last service that performed an operation listed in said request, said message including the results of said last service listed in said request.

11. The medium of claim 10 wherein said method comprises the further steps of:

transmitting the result of said second service and said request to an additional service listed in said request; and using the second result to perform said additional request.

12. The medium of claim 10 wherein said request is an HTTP request.

13. The medium of claims 10 wherein said at least two service requests are encoded using MIME encoding.

14. The medium of claim 10 wherein said method comprises the further steps of:
transmitting said message via a broker device, said broker device being a device located inside a firewall which is authorized by said firewall to accept messages from designated addresses outside said firewall and send messages to designated addresses inside said firewall.

15. In a network having at least two electronic devices and a plurality of services, said plurality of services provided by computer-executable code stored on at least one of said electronic devices, said at least two electronic devices including a requesting device and a receiving device, a method, comprising the steps of:
receiving over a connection at said first service on said receiving device a request from said requesting device, said request including at least two service requests and a callback request, said callback request including a return destination address on the requesting device, said at least two service requests including at least one service request for a service other than said first service;
performing the first service specified in said request;
forwarding a result of said first service and said request to a second service requested in said request;
performing said second service specified in said request, said second service using the results of said first service as input for said second service;
transmitting a message over a new connection from said at least one electronic device holding a last service that performed an operation listed in the request, said message including the results of said last service listed in said request.

16. The method of claim 15, comprising the further steps of:
transmitting a result of said second service and said request to an additional service listed in said request; and
using the second result to perform said additional request.

17. In a network having at least two electronic devices and a plurality of services, said plurality of services provided by computer-executable code stored on at least one of said electronic devices, said at least two electronic devices including a requesting device and a receiving device, a method, comprising the steps of:
receiving over a connection at said first service on said receiving device a request from said requesting device, said request including at least two service requests and a callback request, said callback request including a return destination address on the requesting device, said at least two service requests including at least one service request for a service other than said first service;
performing the first service specified in said request and
forwarding said request and a first result of said first service to a second service listed in said request, said second service performing one of said service requests prior to an acknowledgement being transmitted over a new connection to the requesting device.

18. The method of claim 17, comprising the further steps of:
transmitting said request to an additional service listed in said request; and
performing a requested service with said additional service.

19. The method of claim 18 wherein said additional service uses at least one of the first result from the first service and a second result from a second service to perform said requested service and generate an additional result.

20. The method of claim 19, comprising the further steps of:
transmitting said additional result to said requesting device with said acknowledgement.

* * * * *